(12) United States Patent
Yazaki (10) Patent No.: US 11,916,316 B2
(45) Date of Patent: Feb. 27, 2024

(54) WIRELESS COMMUNICATION DEVICE

(71) Applicant: Murata Manufacturing Co., Ltd., Nagaokakyo (JP)

(72) Inventor: Hirokazu Yazaki, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 600 days.

(21) Appl. No.: 17/132,105

(22) Filed: Dec. 23, 2020

(65) Prior Publication Data
US 2021/0111493 A1 Apr. 15, 2021

Related U.S. Application Data

(63) Continuation of application No. PCT/JP2019/012093, filed on Mar. 22, 2019.

(30) Foreign Application Priority Data

Jul. 25, 2018 (JP) .................. 2018-139148

(51) Int. Cl.
*H01Q 9/26* (2006.01)
*H01Q 1/22* (2006.01)
*H01Q 1/38* (2006.01)
*G06K 19/077* (2006.01)

(52) U.S. Cl.
CPC ............ *H01Q 9/26* (2013.01); *H01Q 1/2225* (2013.01); *H01Q 1/38* (2013.01); *G06K 19/07779* (2013.01); *G06K 19/07798* (2013.01)

(58) Field of Classification Search
CPC .......... H01Q 9/26; H01Q 1/2225; H01Q 1/38; H01Q 5/314; H01Q 9/065; H01Q 9/20; H01Q 5/15; G06K 19/07779; G06K 19/07798

USPC .......................................................... 343/803
See application file for complete search history.

(56) References Cited

U.S. PATENT DOCUMENTS

| | | | |
|---|---|---|---|
| 2008/0129629 A1* | 6/2008 | Kimura | H05K 1/165 343/788 |
| 2018/0123220 A1* | 5/2018 | Forster | H01Q 1/2225 |
| 2018/0189623 A1 | 7/2018 | Forster et al. | |

FOREIGN PATENT DOCUMENTS

| | | |
|---|---|---|
| JP | H04215226 A | 8/1992 |
| JP | 2006338563 A | 12/2006 |
| JP | 2007089054 A | 4/2007 |

OTHER PUBLICATIONS

International Search Report issued for PCT/JP2019/012093, dated May 21, 2019.
Written Opinion of the International Searching Authority issued for PCT/JP2019/012093, dated May 21, 2019.

* cited by examiner

*Primary Examiner* — Jean B Jeanglaude
(74) *Attorney, Agent, or Firm* — ArentFox Schiff LLP (57) ABSTRACT

An RFID tag is provided for transmitting and receiving a communication signal. The RFID tag includes a base material, an antenna pattern disposed on the base material, and a high-loss member. The high-loss member is disposed adjacent to the antenna pattern and has a high loss at a frequency higher than a frequency of the communication signal, compared with the antenna pattern and the base material. When the RFID tag is subjected to an electromagnetic wave heating microwave, the high-loss member generates heat and the antenna pattern is cut at a position of the high-loss member.

20 Claims, 8 Drawing Sheets

λ/4 RESONANCE fo

Fig. 2B

λ/2 RESONANCE 2fo

Fig. 2C

3λ/4 RESONANCE 3fo

Fig. 2D

λ RESONANCE 4fo

WIRELESS COMMUNICATION DEVICE

CROSS REFERENCE TO RELATED APPLICATIONS

The present application is a continuation of PCT/JP2019/012093 filed Mar. 22, 2019, which claims priority to Japanese Patent Application No. 2018-139148, filed Jul. 25, 2018, the entire contents of each of which are incorporated herein by reference.

TECHNICAL FIELD

The present invention relates to a wireless communication device including an antenna, and, more particularly, to a wireless communication device such as an RFID (Radio Frequency Identification) tag that conducts near field communication through an induced electromagnetic field or an electromagnetic wave.

BACKGROUND ART

RFID tags are a type of wireless communication device that is used in various situations because the RFID tag communicates with a reader and writer and reading and writing operations of predetermined information are performed in a noncontact manner. For example, so-called self-checkout is able to be smoothly performed by attaching the RFID tag to products for purchase. In addition, management of sales and distribution conditions, such as securing of traceability and marketing, can be smoothly performed.

On the other hand, a wide variety of products are handled in stores such as a convenience store and a supermarket, and, among food items as products, there are some products that are heated immediately after the products are purchased to be taken out or to be immediately eaten or drunk on the spot by a purchaser. For example, a lunch box or a prepared dish may sometimes be heated at a store using an electromagnetic wave heating device, such as a microwave oven.

However, when the product to which the RFID tag is attached is heated using the microwave oven, the following problems sometimes arise.

While, as a frequency of a communication signal of the RFID tag, an LF band of 135 kHz or less, an HF band such as 13.56 MHz, a UHF band such as a band of 860 MHz to 960 MHz, and a microwave band such as 2.45 GHz are mainly used, at present, the RFID tag of the type attached to the food items is the RFID tag in which the UHF band is used. In the RFID tag in which the UHF band is used, a metal material such as an antenna pattern that is a metal film body is provided on a base material such as paper or a resin together with an RFIC (Radio-Frequency Integrated Circuit) element.

When such a product to which the RFID tag is attached is heated in the microwave oven, energy of an electromagnetic wave from the microwave oven is absorbed by the RFID tag together with the product. Consequently, there is a risk that the RFID tag or a portion of the product to which the RFID tag is attached may ignite due to, for example, one or more of the following reasons: discharge at a place in which electric field strength is enhanced in the metal material; heat generation and sublimation of the metal material due to an overcurrent flowing in the metal material; and heat generation of the base material of the RFID tag.

In particular, since a high-power electromagnetic wave of about 3 kW is radiated inside a chamber of the microwave oven installed in the convenience store, and the RFID tag is heated at once immediately after the start of heating, there is a high risk of the ignition depending on conditions.

In order to reduce the risk of ignition in such an RFID tag, a configuration of a "flame-retardant" tag has been proposed in Japanese Unexamined Patent Application Publication No. 2006-338563 (hereinafter referred to as "Patent Literature 1").

The "flame-retardant" tag disclosed in Patent Literature 1 is a tag in which the base material on which an IC chip and an antenna pattern are mounted is made of a flame-retardant material. For this reason, combustion of the base material is reduced or prevented. However, the metal material provided on the base material has a high possibility of temporally continuous discharge, and no configuration that is able to surely prevent the risk of ignition of the base material and the possibility that the product catches fire is provided.

SUMMARY OF THE INVENTION

Accordingly, it is an object of the present invention to provide a wireless communication device that is constructed to prevent ignition and combustion even in a situation in which the wireless communication device is subjected to high-frequency power for heating a food item while being attached to the food item or the like.

In an exemplary aspect, a wireless communication device is provided that transmits and receives a communication signal and that includes a base material, an antenna pattern disposed on the base material, and a high-loss member that is disposed adjacent to the antenna pattern or a conductor pattern connected in series to the antenna pattern and has a high loss at a frequency higher than a frequency of the communication signal, compared with the antenna pattern and the base material.

According to the exemplary aspect of the above-described structure, when irradiation with high-frequency power of an electromagnetic wave heating microwave band is performed, a large current flows in the antenna pattern and heat is generated. Alternatively, heat is generated by discharge at a place of the antenna pattern at which a potential difference is large. On the other hand, the high-loss member generates heat with high efficiency, and due to this heat, the antenna pattern or the conductor pattern connected in series to the antenna pattern is cut. When the antenna pattern or the conductor pattern is cut, the above-described large current does not flow, and the heat generation is stopped. Alternatively, due to the cutting of the antenna pattern or the conductor pattern, the potential difference at the discharge position disappears or decreases, such that the discharge is not maintained and the heat generation of the antenna pattern is stopped. In any case, the ignition of the base material does not occur. In this manner, melting and deformation of the wireless communication device or the portion of the product to which the wireless communication device is attached are also prevented.

According to the present invention, a wireless communication device is provided that is constructed to prevent the ignition and combustion even when the wireless communication device is subjected to the high-frequency power for heating the food items while being attached to the food items or the like is able to be obtained.

DETAILED DESCRIPTION OF EXEMPLARY EMBODIMENTS

First, configurations of various exemplary aspects in a wireless communication device according to the present invention will be described.

A wireless communication device according to a first exemplary aspect is configured to transmit and receive a communication signal and includes a base material, an antenna pattern provided on the base material, and a high-loss member that is disposed adjacent to this antenna pattern or a conductor pattern connected in series to this antenna pattern and has a high loss at a frequency higher than a frequency of the communication signal as compared with the antenna pattern and the base material.

When the wireless communication device of the first exemplary aspect is subjected to the irradiation of the microwave in the chamber of the microwave oven, for example, the above-described high-loss member particularly generates heat. Due to this heat, the base material locally deforms and thus stress applied to the antenna pattern is increased. In addition, the antenna pattern or the conductor pattern at a position of the high-loss member is melted and cut or sublimated. These effects cause the antenna pattern or the conductor pattern to be cut. When the antenna pattern or the conductor pattern is cut, the above-described large current does not flow, and the heat generation is stopped. Alternatively, due to the cutting of the antenna pattern or the conductor pattern, the potential difference at the discharge position disappears or decreases, and the discharge is not maintained, so that the heat generation of the antenna pattern is stopped.

In other words, according to the exemplary embodiment, the above-described high-loss member is provided, so that controlled, highly efficient, and local heating is performed, and thus the heat generation of the antenna pattern can be stopped before the base material ignites. Therefore, melting and deformation of the wireless communication device or a portion of a product to which the wireless communication device is attached are also prevented.

In a wireless communication device of a second exemplary aspect, the high-loss member is disposed in contact with a portion of the antenna pattern. According to this configuration, the heat required for the cutting of the antenna pattern is applied with high efficiency to a predetermined place of the antenna pattern, and the antenna pattern is quickly cut.

In a wireless communication device of a third exemplary aspect, the high-loss member is provided at a cutting position such that a cutting of the antenna pattern or the conductor pattern at the cutting position prevents a resonance of the antenna pattern at a frequency of an electromagnetic wave heating microwave. According to this configuration, when the antenna pattern or the conductor pattern is cut at the position of the high-loss member, the antenna pattern immediately stops the heat generation due to the resonance at the frequency of the electromagnetic wave heating microwave band, so that a temperature rise is effectively reduced or prevented.

In a wireless communication device of a fourth exemplary aspect, the high-loss member is ferrite of a chip ferrite bead, and the conductor pattern is a conductor pattern provided in the chip ferrite bead. According to this configuration, mounting to the base material is easy and the high-loss member can be easily provided.

In general, in a convenience store and a supermarket that sell a product to which a wireless communication device is attached, a wide variety of products such as food items and household goods are handled. In recent years, regarding the convenience store, various experiments have been conducted toward practical application of an "unmanned" convenience store that automates accounting and packing of a purchased product.

In order to automate the accounting of the product in the "unmanned" convenience store, an RFID tag configured as a wireless communication device can be attached to all the products. In the "unmanned" convenience store, a system is provided such that information from the RFID tag is read to display a product price when a shopping basket that accommodates a product to which the RFID tag is attached is placed on a checkout table. A purchaser inserts cash for the product price into a cash slot or inserts a credit card to complete payment, and receives the product automatically packed in a shopping bag, so that the purchase of the product is completed in the "unmanned" convenience store.

Hereinafter, exemplary embodiments that are a specific illustration of a wireless communication device according to the exemplary embodiments of the present invention will be described with reference to the attached drawings. As the product to which the wireless communication device according to the present invention is to be attached, all products handled in a store, such as a convenience store and supermarket, are considered.

Although a microwave oven that performs dielectric heating will be described as an electromagnetic wave heating device described in the following exemplary embodiments, it is noted that a heating device having a function of performing dielectric heating is considered as the electromagnetic wave heating device of the present invention. Further, in the following exemplary embodiments, an RFID tag attached to the product will be described as an example of the wireless communication device.

First Exemplary Embodiment

Figure 1A:
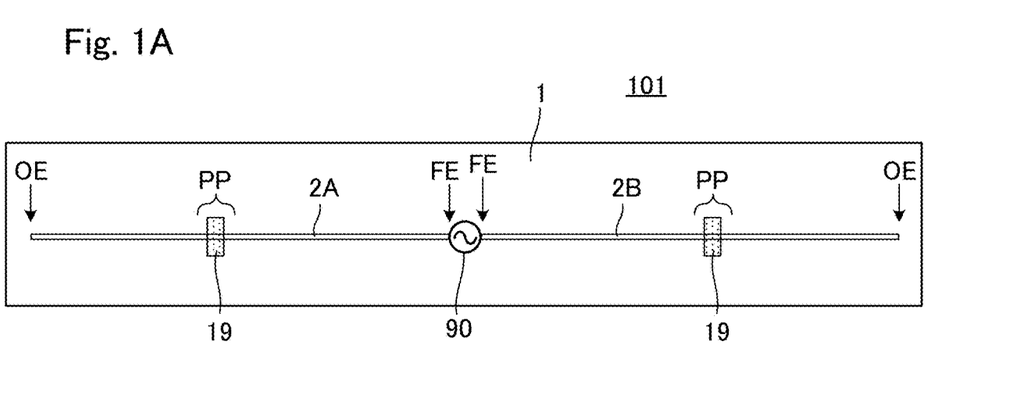
FIG. 1A is a plan view of an RFID tag 101 according to a first exemplary embodiment.
Figure 1B:
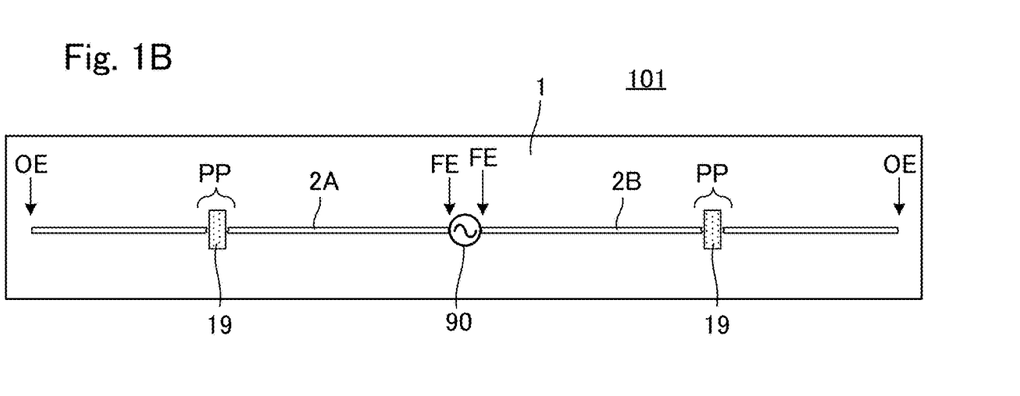
FIG. 1B is a plan view of the RFID tag 101 illustrating a state after a portion of an antenna pattern is cut.

FIG. 1A is a plan view of an RFID tag 101 according to a first exemplary embodiment, and FIG. 1B is a plan view of the RFID tag 101 illustrating a state after a portion of an antenna pattern is cut.

As illustrated in FIG. 1A, the RFID tag 101 includes a base material 1 made of an insulator or a dielectric, antenna patterns 2A, 2B provided on the base material 1, and a feeding circuit 90 that supplies power to the antenna patterns 2A, 2B.

The RFID tag 101 is configured to conduct wireless communication (i.e., transmission and reception) using a high-frequency signal having a frequency (e.g., a carrier frequency) of a communication signal in a UHF band. The UHF band is a frequency band of 860 MHz to 960 MHz. Here, the frequency of the communication signal in the UHF band is an example of a frequency of a communication signal in the present disclosure.

Moreover, the feeding circuit 90, for example, is an RFIC element, an RFIC package, or the like to be illustrated below. In the RFID tag 101 of the present exemplary embodiment, a flexible film material or a flame-retardant film material is used as the base material 1. The base material 1 has an outline of a rectangular shape in a plan view. In addition, in a case in which the base material 1 is a normal film material that is not flame-retardant, a thickness of the base material 1 may be less than or equal to 38 μm. Consequently, before burning, the base material 1 melts and deforms, allowing the shape of the base material not to be maintained.

In a case in which a flame-retardant film is used as the base material 1, for example, a film in which a halogen-based flame-retardant material is added to a resin material such as a PET (polyethylene terephthalate) resin and a PPS (polyphenylene sulfide) resin or a film in which such a resin material is coated with a flame-retardant coating material is used as the flame-retardant film material to be used. As a material for the base material 1, a resin material that has high functions in terms of heat resistance, hydrolysis resistance and chemical resistance, such as a heat-resistant PEN (polyethylene naphthalate) resin, is also able to be used. It is to be noted that a flame-retardant material is not necessarily needed for the base material 1, and the base material 1 is also able to be made of a paper material, for example.

The antenna patterns 2A, 2B are provided on a surface of the base material 1. The feeding circuit 90 is electrically connected to the antenna patterns 2A, 2B provided on the surface of the base material 1.

In an exemplary aspect, the antenna patterns 2A, 2B are made of a metal material having high conductivity, such as an aluminum foil and a copper foil. It is to be noted that a carbon-based material in addition to the metal material may be used in alternative aspects.

As illustrated in FIG. 1A, the antenna patterns 2A, 2B extend from the feeding circuit 90 in opposite directions. The antenna patterns 2A, 2B are patterns configuring a dipole type electric field antenna in which the feeding circuit 90 is connected to a feeding circuit connection end FE, and a leading end is an open end OE.

Moreover, the RFID tag 101 includes a high-loss member 19 (at least one) adjacent to a predetermined adjacent position PP of the antenna patterns 2A, 2B. In the present exemplary embodiment, the high-loss member 19 (also referred to as a device protection component) overlaps the antenna patterns 2A, 2B in a plan view. In other words, the high-loss member 19 is adjacent to the antenna patterns 2A, 2B in a thickness direction. For example, the high-loss member 19 primarily includes ferrite of which the hysteresis loss or the eddy current loss is large, compared with the antenna patterns 2A, 2B. Specifically, a pattern of the high-loss member 19 is formed by printing ferrite paste in which ferrite powder is distributed to solvent, on the base material 1. Alternatively, the high-loss member 19 is provided by adhering a very small fired ferrite sheet to the base material 1.

When the RFID tag 101 is irradiated with the electromagnetic wave heating microwave, each of the high-loss member 19, the antenna patterns 2A, 2B, and the base material 1 is heated, and rise in temperature. According to the exemplary aspect, the high-loss member 19 is constructed such that the heating efficiency of the high-loss member 19 is higher than the heating efficiency of the base material 1 and the antenna patterns 2A, 2B. Therefore, the temperature of the high-loss member 19 quickly rises, and a portion of the antenna patterns 2A, 2B that overlaps the high-loss member 19 is locally heated. In addition, a portion of the base material 1 on which the high-loss member 19 is provided is locally heated. Due to this heat, the base material 1 locally deforms and thus stress applied to the antenna patterns 2A, 2B is increased. Alternatively or in addition thereto, the antenna patterns 2A, 2B are melted and cut or sublimated. These cause the antenna patterns 2A, 2B to be cut.

FIG. 1B illustrates a state after the antenna patterns 2A, 2B are cut at the adjacent position PP in such a manner.

As illustrated in FIG. 1B, when the antenna patterns 2A, 2B are cut at the adjacent position PP of the high-loss member 19, effective lengths of the antenna patterns 2A, 2B are shortened, and the resonance is not generated at the frequency of the electromagnetic wave heating microwave band, and thus, even when the irradiation of the electromagnetic wave heating microwave continues, a resonance current due to the microwave does not flow in the antenna patterns 2A, 2B, the temperature rise stops, and the ignition (e.g., combustion) does not occur.

Examples of a resonance mode at the frequency of the communication signal and a resonance mode at the frequency of the electromagnetic wave heating microwave in the antenna patterns 2A, 2B will be illustrated with reference to FIG. 2A, FIG. 2B, FIG. 2C, and FIG. 2D. FIG. 2A to 2D illustrate an example of a resonance mode at a frequency of a communication signal or a resonance mode at a frequency of an electromagnetic wave heating microwave in terms of a current distribution and a voltage distribution. In the resonance mode illustrated in FIG. 2A, fundamental resonance is generated at a resonance frequency fo and at a quarter wavelength from a feeding end to an open end. In the resonance mode illustrated in FIG. 2B, harmonic resonance is generated at a resonance frequency $2fo$ and at a half wavelength from the feeding end to the open end. In the resonance mode illustrated in FIG. 2C, the harmonic resonance is generated at a resonance frequency $3fo$ and at a three-quarter wavelength from the feeding end to the open end. In the resonance mode illustrated in FIG. 2D, the harmonic resonance is generated at a resonance frequency $4fo$ and at one wavelength from the feeding end to the open end.

Figure 2A:
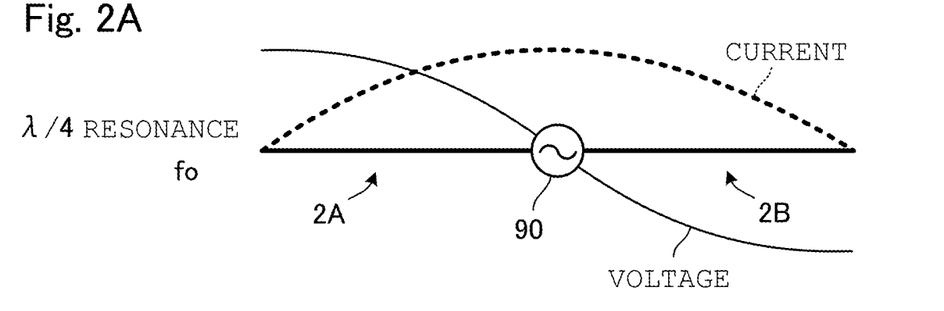
FIG. 2A, FIG. 2B, FIG. 2C, and FIG. 2D illustrate an example of a resonance mode at a frequency of a communication signal or a resonance mode at a frequency of an electromagnetic wave heating microwave in terms of a current distribution and a voltage distribution.

The dipole type antenna of the antenna patterns 2A, 2B is configured to resonate at the frequency of a communication signal, for example, at the quarter wavelength illustrated in FIG. 2A. Alternatively, the dipole type antenna resonates at the half wavelength illustrated in FIG. 2B. Under the condition that high-order resonance modes as illustrated in FIG.

Figure 2B:
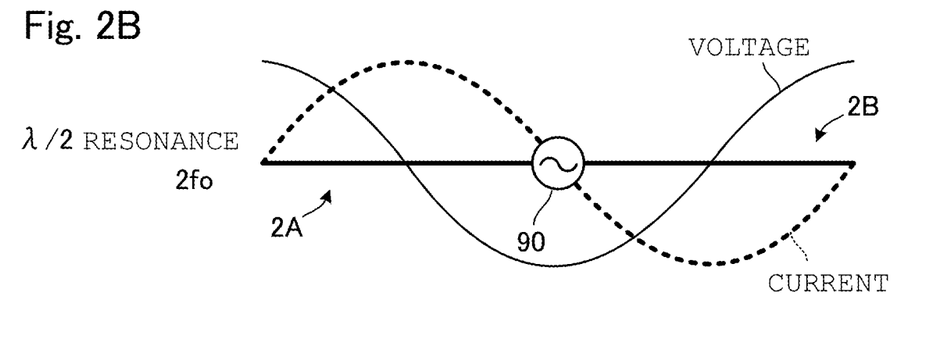
Figure 2C:
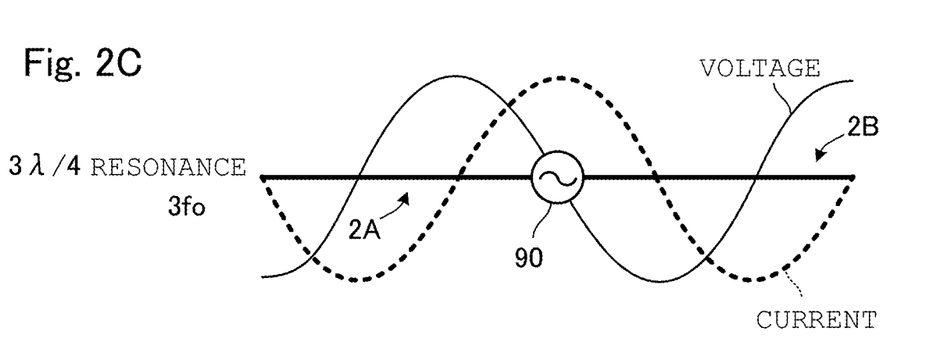
Figure 2D:
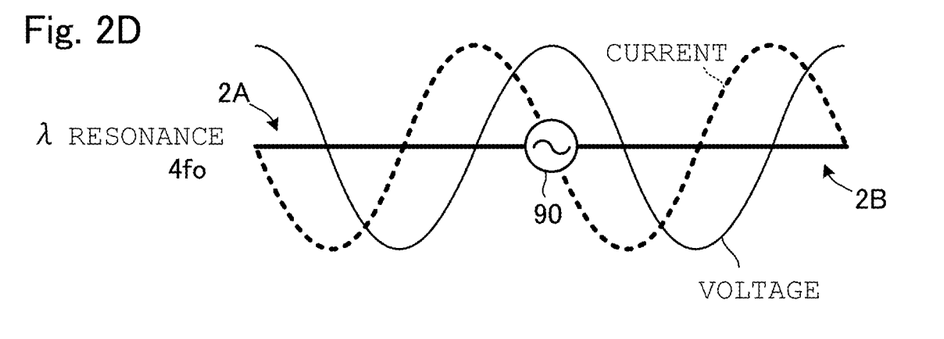

2B, FIG. 2C, and FIG. 2D are generated at the frequency of the electromagnetic wave heating microwave in the dipole type antenna, a large current is induced in the antenna patterns 2A, 2B by the high power of the microwaves, and heat is generated. However, as illustrated in FIG. 1B, the antenna patterns 2A, 2B are cut at an intermediate position of the antenna patterns 2A, 2B, so that the antenna patterns 2A, 2B are substantially shortened, and the resonance is not generated at the frequency of the electromagnetic wave heating microwave band. Thus, even when the irradiation of the electromagnetic wave heating microwave continues, the resonance current due to the microwave does not flow in the antenna patterns 2A, 2B, the temperature rise is stopped, and the ignition (e.g., combustion) does not occur.

Figure 3A:
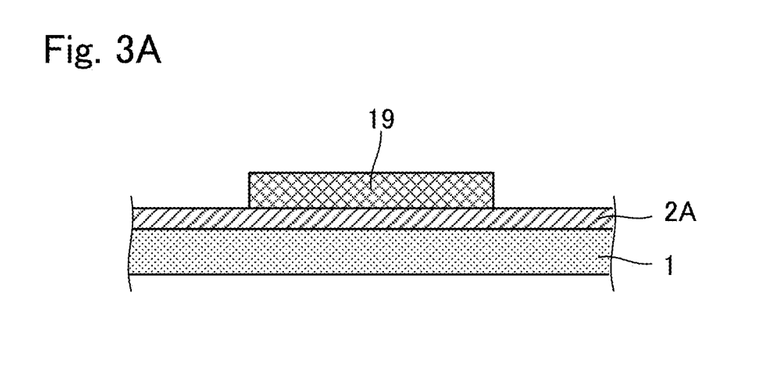
FIG. 3A and FIG. 3B are partial cross-sectional views illustrating an example of a structure of a position at which a high-loss member 19 is provided, with respect to a base material 1.
Figure 3B:
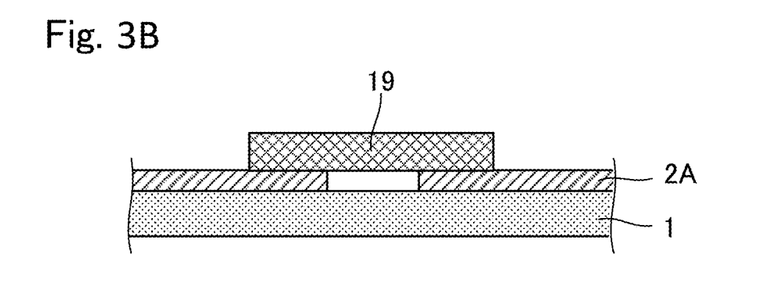

FIG. 3A and FIG. 3B are partial cross-sectional views illustrating an example of a structure at a position at which a high-loss member 19 is provided, with respect to a base material 1.

In the example illustrated in FIG. 3A, the antenna pattern 2A is provided or otherwise disposed on the top surface of the base material 1, and the high-loss member 19 is provided or otherwise disposed on the top surface of the base material 1 so as to cover a portion of the antenna pattern 2A. As have been described, the high-loss member 19 can be formed by, after printing of ferrite paste, baking of the ferrite paste or heating and drying of the ferrite paste. The high-loss member 19 can also be formed by attaching of a ferrite sheet formed into a sheet shape.

When the RFID tag 101 is irradiated with the electromagnetic wave heating microwave, each of the high-loss member 19, the antenna pattern 2A, and the base material 1 is heated, and rises in temperature. Moreover, the heating efficiency of the high-loss member 19 is higher than the heating efficiency of the base material 1 and the antenna patterns 2A, 2B. Therefore, the temperature of the high-loss member 19 quickly rises, and a portion of the antenna patterns 2A, 2B that overlaps the high-loss member 19 is locally heated. In addition, a portion of the base material 1 on which the high-loss member 19 is provided is locally heated. Due to this heat, as illustrated in FIG. 3B, the antenna pattern 2A is cut.

Figure 4A:
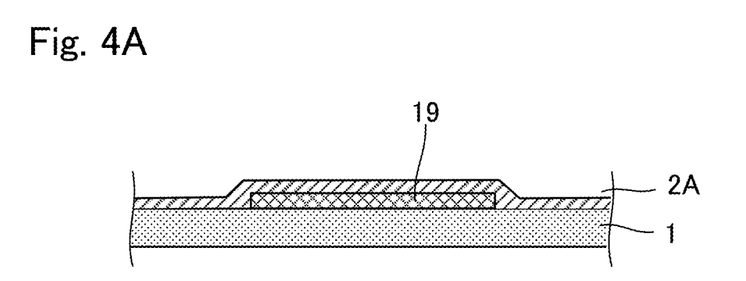
FIG. 4A and FIG. 4B are partial cross-sectional views illustrating another example of a structure of a position at which the high-loss member 19 is provided, with respect to the base material 1.
Figure 4B:
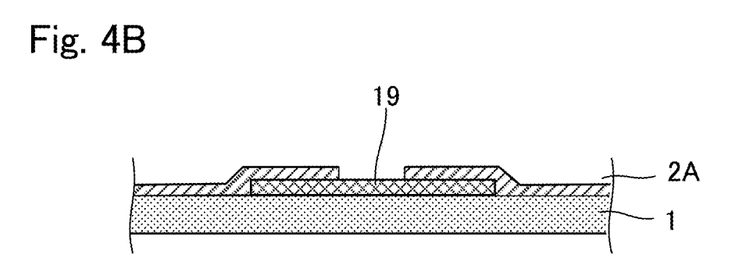

FIG. 4A and FIG. 4B are partial cross-sectional views illustrating another example of a structure at a position at which the high-loss member 19 is provided, with respect to the base material 1.

In the example illustrated in FIG. 4A, the high-loss member 19 is provided on the top surface of the base material 1, and the antenna pattern 2A is provided on the base material 1 so as to pass over this high-loss member 19. In an exemplary aspect, the high-loss member 19 can be formed by, after printing of ferrite paste, baking of the ferrite paste or heating and drying of the ferrite paste. The high-loss member 19 can also be formed by attaching of a ferrite sheet formed into a sheet shape. Even with the structure illustrated in this FIG. 4A, the RFID tag 101 is irradiated with the electromagnetic wave heating microwave, so that the temperature of the high-loss member 19 quickly rises, and the portion in which the high-loss member 19 is provided is locally heated. Due to this heat, the antenna pattern 2A is cut.

It is to be noted that, although the antenna pattern 2A is illustrated in the example illustrated in FIG. 3A, FIG. 3B, FIG. 4A, and FIG. 4B, the same applies to the antenna pattern 2B.

Second Exemplary Embodiment

In a second exemplary embodiment, an RFID tag in which the shapes of an antenna pattern and a high-loss member are different from the example illustrated in the first exemplary embodiment will be described.

Figure 5A:
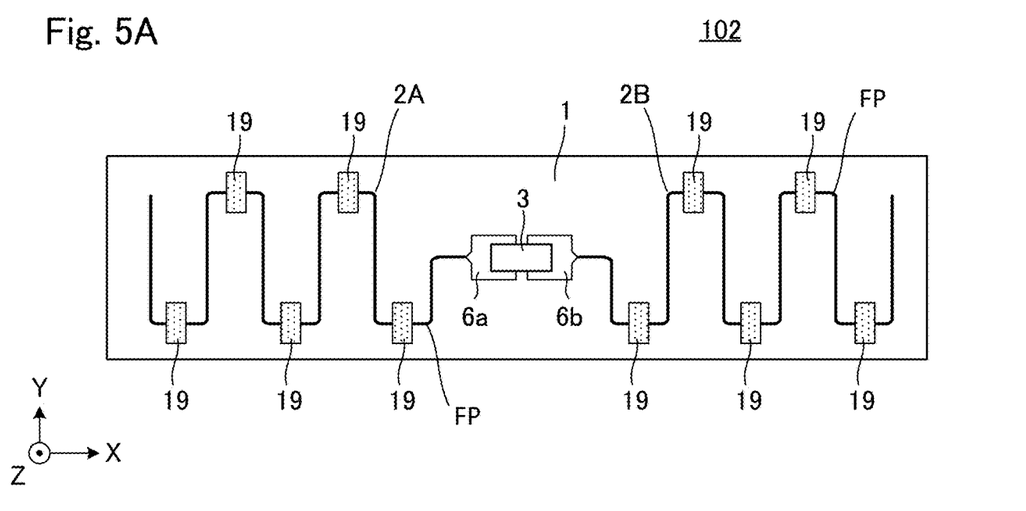
FIG. 5A is a plan view of an RFID tag 102 according to a second exemplary embodiment.
Figure 5B:
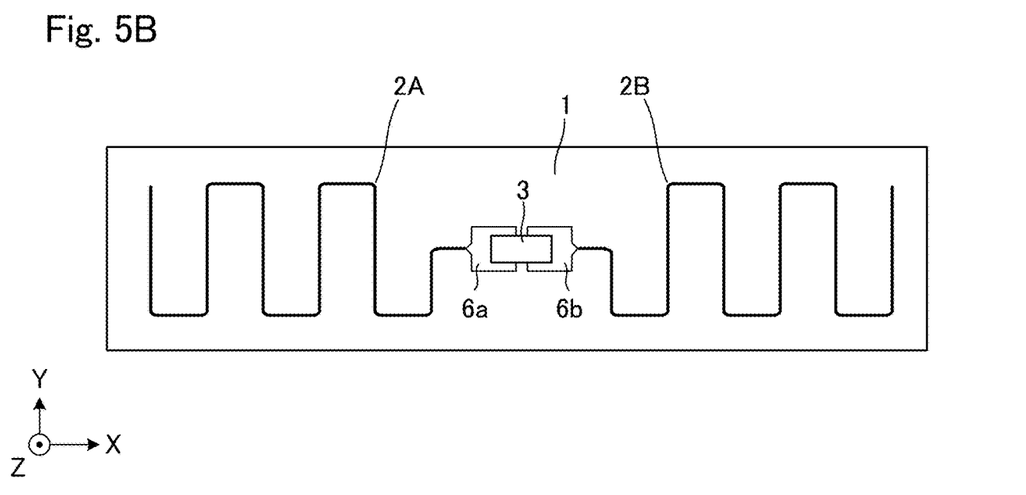
FIG. 5B is a plan view of the base material 1 before the high-loss member 19 is provided.

FIG. 5A is a plan view of an RFID tag 102 according to the second exemplary embodiment. FIG. 5B is a plan view of the base material 1 before a high-loss member 19 to be described below is provided.

The RFID tag 102 as illustrated in FIG. 5A includes a base material 1 made of an insulator or a dielectric, antenna patterns 2A, 2B provided on the base material 1, and an RFIC package 3 connected to the antenna patterns 2A, 2B. In addition, a plurality of high-loss members 19 are provided on the base material 1.

As illustrated in FIG. 5A, the antenna patterns 2A, 2B have a meandering line shape and are each configured to extend, with the first antenna pattern 2A having the meandering line shape that meanders from a first land pattern 6a on which the RFIC package 3 is mounted while including a plurality of folded portions FP, and with the second antenna pattern 2B having the meandering line shape that meanders from a second land pattern 6b on which the RFIC package 3 is mounted while including a plurality of folded portions. In other words, the first antenna pattern 2A having the meandering line shape extends from the first land pattern 6a toward one end in a longitudinal direction (e.g., in a negative X direction) of the base material 1. In addition, the second antenna pattern 2B having the meandering line shape extends from the second land pattern 6b toward the other end in the longitudinal direction (e.g., in a positive X direction) of the base material 1.

With the above configuration, the antenna patterns 2A, 2B act as a dipole type electric field antenna.

The folded portions FP of the antenna patterns 2A, 2B are places in which the extending direction of each of the antenna patterns 2A, 2B is reversed. The high-loss member 19 is provided at the folded portions FP of the antenna patterns 2A, 2B.

When the RFID tag 102 is irradiated with the electromagnetic wave heating microwave, the temperature of the high-loss member 19 quickly rises. Due to the heat of this high-loss member 19, the antenna patterns 2A, 2B are cut at a position at which the high-loss member 19 is provided.

The RFID tag 102 configured as described above also provides the same effects as the RFID tag 101 illustrated in the first exemplary embodiment. In particular, in the present exemplary embodiment, since the plurality of high-loss members 19 are provided for each of the antenna patterns 2A, 2B, even when the antenna patterns 2A, 2B are not cut at some positions in which the high-loss member 19 is provided, the possibility that the antenna patterns 2A, 2B are cut at a position of the antenna patterns 2A, 2B is high.

It is noted that the high-loss member 19 can be provided at conductor patterns (e.g., conductor patterns other than the folded portions FP of the antenna patterns 2A, 2B) that are opposed to each other due to the antenna patterns 2A, 2B folded back at the folded portions FP of the antenna patterns 2A, 2B.

Figure 6:
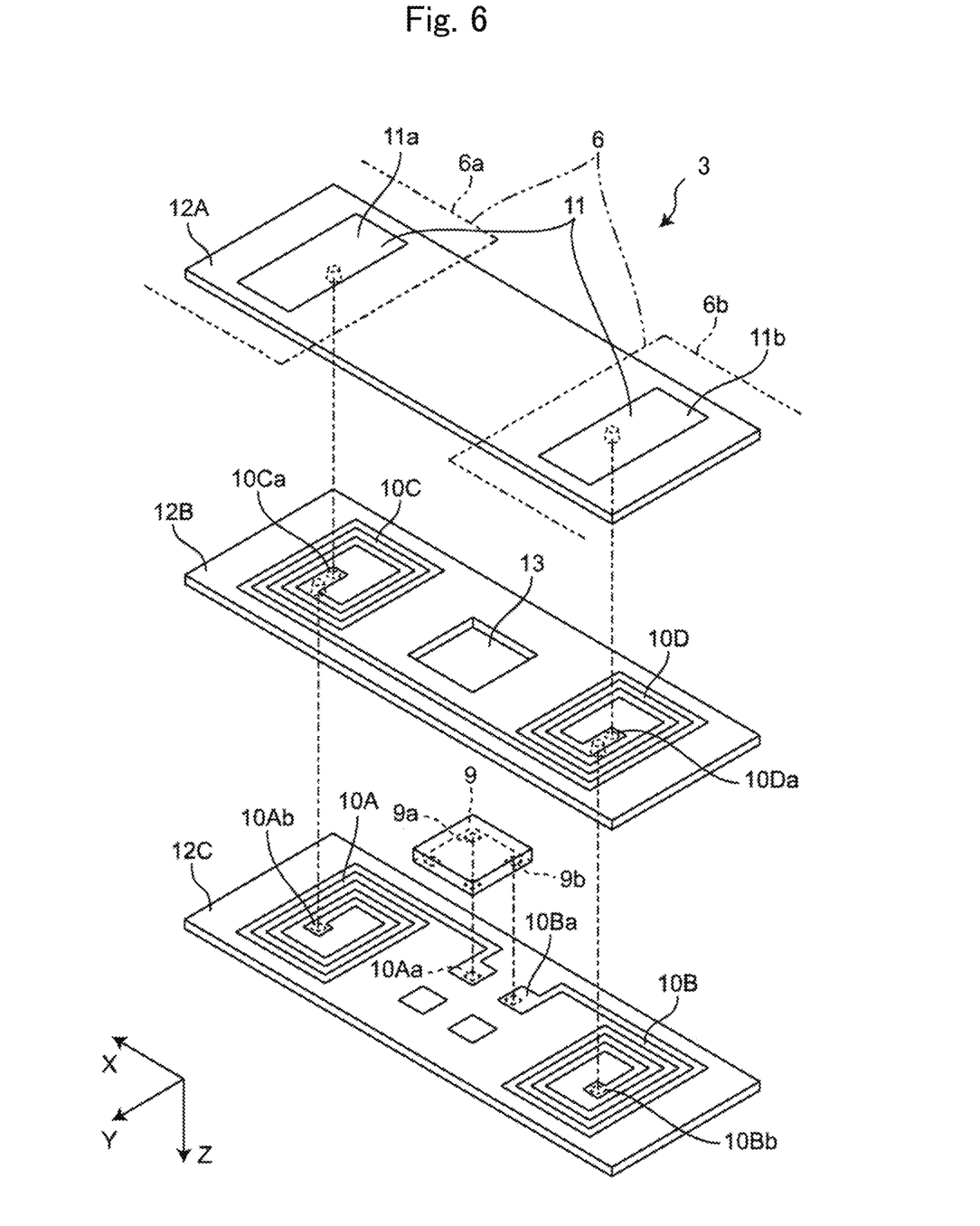
FIG. 6 is an exploded perspective view illustrating a configuration of the RFIC package 3 mounted on a land pattern 6 (6a, 6b) of the antenna patterns 2A, 2B.

FIG. 6 is an exploded perspective view illustrating a configuration of the RFIC package 3 mounted on a land pattern 6 (6a, 6b) of the antenna patterns 2A, 2B. As illustrated in FIG. 6, the RFIC package 3 of the first exemplary embodiment is constructed with a multilayer substrate including three layers. Specifically, the multilayer substrate of the RFIC package 3 is made of a resin material such as polyimide and a liquid crystal polymer, and is formed by stacking three flexible insulation sheets 12A, 12B, 12C. The insulation sheets 12A, 12B, 12C have a substantially quadrilateral shape in a plan view, and have a substantially rectangular shape in the present exemplary embodiment. The RFIC package 3 in FIG. 6 illustrates a state in which the RFIC package 3 as illustrated in FIG. 5A is turned over and the three layers are disassembled.

As illustrated in FIG. 6, in the RFIC package 3, an RFIC chip 9, a plurality of inductance elements 10A, 10B, 10C, 10D, and external connection terminals 11 (11a, 11b) to be connected to the antenna patterns 2A, 2B are provided at desired positions on three layered substrates (insulation sheets 12A, 12B, 12C).

As shown, the external connection terminals 11a, 11b are provided on the first insulation sheet 12A that defines a lowermost layer (i.e., the substrate opposed to the antenna patterns 2A, 2B), and provided at positions opposed to the land patterns 6a, 6b of the antenna patterns 2A, 2B. The four inductance elements 10A, 10B, 10C, 10D are separated into groups of two and provided on the second insulation sheet 12B and the third insulation sheet 12C. In other words, the first inductance element 10A and the second inductance element 10B are provided on the third insulation sheet 12C that defines an uppermost layer (e.g., a layer described at the lowest position in FIG. 6), and the third inductance element 10C and the fourth inductance element 10D are provided on the second insulation sheet 12B that defines an intermediate layer.

In the RFIC package 3 of the present exemplary embodiment, the external connection terminals 11a, 11b and the four inductance elements 10A, 10B, 10C, 10D are constructed with a conductor pattern made of a conductive material such as an aluminum foil and a copper foil.

As illustrated in FIG. 6, the RFIC chip 9 is mounted on the third insulation sheet 12C that defines the uppermost layer, in a central portion in the longitudinal direction (i.e., the X direction in FIG. 6). The RFIC chip 9 has a structure in which an RF circuit is provided on a semiconductor substrate made of a semiconductor such as silicon. The first inductance element 10A formed into a spiral shape on one side (e.g., a side in the positive X direction in FIG. 6) in the longitudinal direction on the third insulation sheet 12C is connected to one input-output terminal 9a of the RFIC chip 9 through a land 10Aa. The second inductance element 10B formed into a spiral shape on the other side (e.g., a side in the negative X direction in FIG. 6) in the longitudinal direction on the third insulation sheet 12C is connected to the other input-output terminal 9b of the RFIC chip 9 through a land 10Ba.

The spiral-shaped third inductance element 10C is provided on one side (e.g., the side in the positive X direction in FIG. 6) in the longitudinal direction on the second insulation sheet 12B that defines the intermediate layer, and the spiral-shaped fourth inductance element 10D is provided on the other side (e.g., the side in the negative X direction in FIG. 6) in the longitudinal direction on the second insulation sheet 12B. The end on the outer peripheral side of the spiral-shaped third inductance element 10C and the end on the outer peripheral side of the spiral-shaped fourth inductance element 10D are directly connected to each other. On the other hand, a land 10Ca that is an end on an inner peripheral side of the third inductance element 10C is connected to a land 10Ab that is an end on the inner peripheral side of the spiral-shaped first inductance element 10A on the third insulation sheet 12C through an interlayer connection conductor such as a via conductor that penetrates the second insulation sheet 12B. In addition, the land 10Ca that is an end on the inner peripheral side of the third inductance element 10C is connected to the first external connection terminal 11a on the first insulation sheet 12A through an interlayer connection conductor such as a through-hole conductor that penetrates the first insulation sheet 12A that defines the lowermost layer.

As further shown, a land 10Da that is an end on the inner peripheral side of the fourth inductance element 10D is connected to a land 10Bb that is an end on the inner peripheral side of the spiral-shaped second inductance element 10B on the third insulation sheet 12C through an interlayer connection conductor such as a through-hole conductor that penetrates the second insulation sheet 12B. In addition, the land 10Da that is the end on the inner peripheral side of the fourth inductance element 10D is connected to the second external connection terminal 11b on the first insulation sheet 12A through an interlayer connection conductor such as a through-hole conductor that penetrates the first insulation sheet 12A that defines the lowermost layer.

The first external connection terminal 11a on the first insulation sheet 12A is disposed so as to be connected to the first land pattern 6a of the first antenna pattern 2A provided on the base material 1. In addition, the second external connection terminal 11b on the first insulation sheet 12A is disposed to be connected to the second land pattern 6b of the second antenna pattern 2B provided on the base material 1.

Moreover, a through hole 13 in which the RFIC chip 9 mounted on the third insulation sheet 12C is accommodated is provided in the second insulation sheet 12B that defines the intermediate layer. The RFIC chip 9 is disposed between the first inductance element 10A and the second inductance element 10B and between the third inductance element 10C and the fourth inductance element 10D. For this reason, the RFIC chip 9 is configured to function as a shield, magnetic field coupling and electric field coupling between the first inductance element 10A and the second inductance element 10B are reduced or prevented, and similarly magnetic field coupling and electric field coupling between the third inductance element 10C and the fourth inductance element 10D are reduced or prevented. As a result, in the RFIC package 3, narrowing of a passband of the communication signal is reduced or prevented, and the passband is widened.

In the present exemplary embodiment, while the RFIC package 3 is mounted on the antenna patterns 2A, 2B, the RFIC chip 9 may be directly mounted on the antenna patterns 2A, 2B. Further, in such a case, the inductors configured as the plurality of inductance elements 10A, 10B, 10C, 10D in the RFIC package 3 may be configured on the base material 1 while having a loop-shaped pattern.

Figure 7:
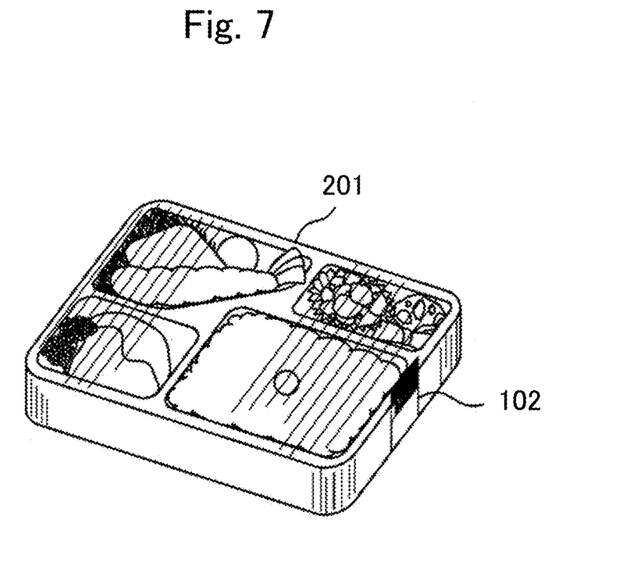
FIG. 7 illustrates an example of a product to which an RFID tag is attached, and is a perspective view illustrating a lunch box 201 to which the RFID tag 102 is attached.

FIG. 7 illustrates an example of a product to which an RFID tag is attached, and is a perspective view illustrating a lunch box 201 to which the RFID tag 102 is attached.

As described above, even when the lunch box 201 to which the RFID tag 102 is attached is heated by the microwave oven, the ignition of the RFID tag 102 is prevented. Similarly, the melting and deformation of a wrapping film of the lunch box 201 to which the RFID tag 102 is attached is also prevented.

It is to be noted that the above example has described the RFID tag having such a structure that the high-loss member 19 overlaps the antenna patterns 2A, 2B in a plan view, that is, the high-loss member 19 is adjacent to the antenna patterns 2A, 2B in the thickness direction. However, it is noted that the exemplary aspects of the present invention are not limited to this structure and the high-loss member 19 may be disposed near the antenna patterns 2A, 2B in a plan view.

Third Exemplary Embodiment

For example, in a third exemplary embodiment, an example of an RFID tag different from the second exemplary embodiment in a shape of the high-loss member and a position at which the high-loss member is provided will be described.

Figure 8A:
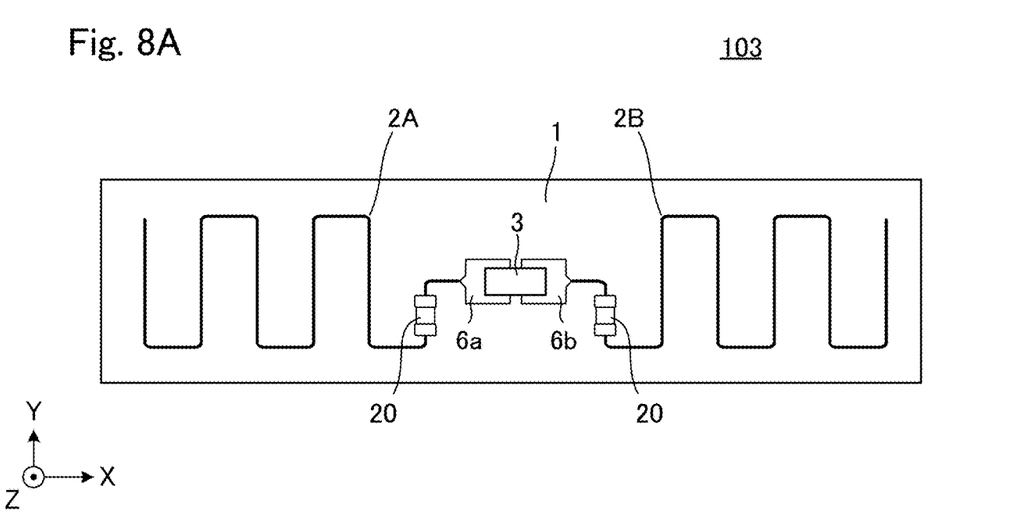
FIG. 8A is a plan view of an RFID tag 103 according to a third exemplary embodiment.
Figure 8B:
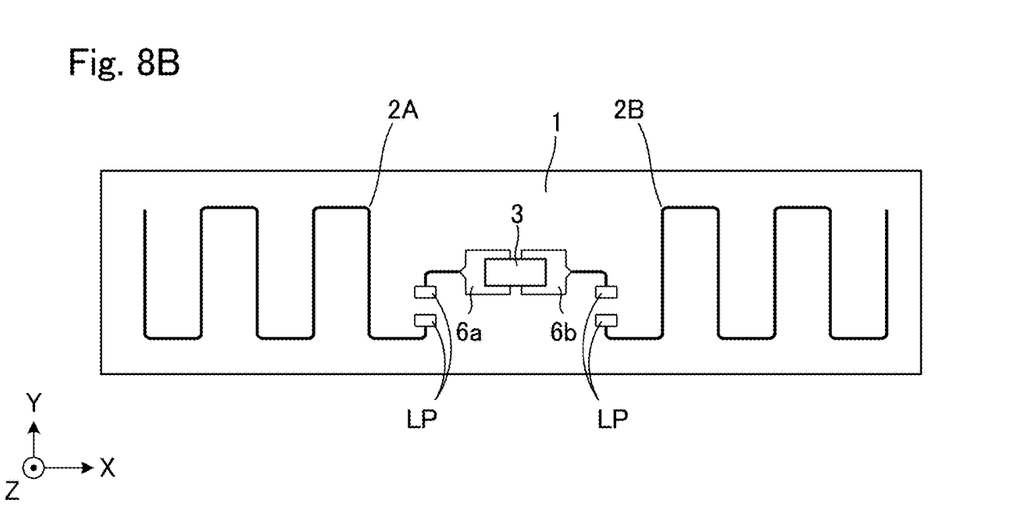
FIG. 8B is a plan view of the base material 1 in a state before a chip ferrite bead 20 is mounted.

FIG. 8A is a plan view of an RFID tag 103 according to a third exemplary embodiment. FIG. 8B is a plan view of the base material 1 in a state before a chip ferrite bead 20 to be described below is mounted.

As illustrated in FIG. 8A, the RFID tag 103 includes a base material 1 made of an insulator or a dielectric, antenna patterns 2A, 2B provided on the base material 1, and an RFIC package 3 connected to the antenna patterns 2A, 2B. In addition, a chip ferrite bead 20 is mounted at a predetermined position on the base material 1. As illustrated in FIG. 8B, a land pattern LP is provided at the position at which the chip ferrite bead 20 is mounted. This chip ferrite bead 20 is connected to this land pattern LP. In other words, the chip ferrite bead 20 is connected in series to each of the antenna patterns 2A, 2B.

The above-described chip ferrite bead 20 is an element such that when the electromagnetic wave heating microwave is received, internal ferrite generates heat due to loss, and thus an internal conductor pattern is broken due to the heat. For example, the above-described chip ferrite bead 20 is configured by stacking ferrite green sheets including a coil pattern and an interlayer connection conductor that are made of conductive paste, and integrating and firing the sheets. This chip ferrite bead 20 is connected in series to the antenna patterns 2A, 2B, so that the conductor pattern in the chip ferrite bead 20 is connected in series to the antenna patterns 2A, 2B. In addition, a ferrite portion in the chip ferrite bead 20 corresponds to the high-loss member of the present invention. This chip ferrite bead 20, when being subjected to the electromagnetic wave heating microwave, generates heat due to the hysteresis loss or eddy current loss of the ferrite portion of the chip ferrite bead 20. Due to this heat, the conductor pattern in the chip ferrite bead 20 is broken.

The hysteresis loss or eddy current loss in the ferrite of the chip ferrite bead 20 has frequency dependence, and the loss is low as the frequency is lower. Therefore, when the frequency band of a communication signal is a frequency band lower than the electromagnetic wave heating microwave band, the loss in the chip ferrite bead 20 is small at the time of communication.

When the RFID tag 103 is subjected to the electromagnetic wave heating microwave, the ferrite in the chip ferrite bead 20 generates heat with high efficiency, and the conductor pattern is broken. When the conductor pattern of the chip ferrite bead 20 is broken, the antenna patterns 2A, 2B stop heat generation due to resonance at the frequency of the electromagnetic wave heating microwave band, so that the temperature rise is effectively reduced or prevented.

In particular, the chip ferrite bead 20 is preferably disposed at a position such that a breaking of the conductor pattern of this chip ferrite bead 20 at the position prevents the resonance of the antenna patterns 2A, 2B at the frequency of the electromagnetic wave heating microwave. In other words, the chip ferrite bead 20 is preferably inserted into a position at which current density is high in a resonance mode at the frequency of the electromagnetic wave heating microwave.

Under the condition that the antenna patterns 2A, 2B resonate at the frequency of the electromagnetic wave heating microwave, for example, at a three-quarter wavelength illustrated in FIG. 2C, the insert position of the chip ferrite bead 20 illustrated in FIG. 8A, since being a position near the feeding circuit 90, is a position in which the current density of the three-quarter wavelength resonance is high.

On the other hand, under the condition that the antenna patterns 2A, 2B resonate at the frequency of a communication signal, for example, at a half wavelength illustrated in FIG. 2B, since the current density at the insert position (e.g., the position near the feeding circuit 90) of the chip ferrite bead 20 is low, the loss of the communication signal due to the chip ferrite bead 20 is reduced to be low. In other words, in addition to the low-loss characteristics of the chip ferrite bead 20 due to the frequency dependence described above, the loss of the communication signal is also reduced or prevented due to an appropriate position at which the chip ferrite bead 20 is inserted into the antenna patterns 2A, 2B.

It is also noted that, as described in the present exemplary embodiment, the element (e.g., the chip ferrite bead 20, for example) in which the high-loss member and the conductor pattern to be broken by the electric power of the electromagnetic wave heating microwave are integrated may be inserted into an intermediate position of the antenna patterns 2A, 2B, as illustrated in FIG. 1A. In addition, as illustrated in FIG. 5A, such an element may be inserted into a plurality of positions of the antenna patterns 2A, 2B.

As described above, as illustrated in some exemplary embodiments, the antenna patterns 2A, 2B, since being subjected to the electromagnetic wave heating microwave, is cut at the intermediate position of the antenna patterns 2A, 2B, so that the heat generation of the antenna patterns 2A, 2B is reduced or prevented.

It is also noted that the high-loss member 19 can be provided only on one of the first antenna pattern 2A and the second antenna pattern 2B. Even in such a case, when the antenna patterns 2A, 2B are cut at the adjacent position PP of the high-loss member 19, the effective lengths of the antenna patterns 2A, 2B are shortened, the resonance with the electromagnetic wave heating microwave is not maintained, and the heat generation of the antenna patterns 2A, 2B is stopped.

In addition, although, in the example illustrated in FIG. 5A, FIG. 5B, FIG. 8A, and FIG. 8B, the shapes of the first antenna pattern 2A and the second antenna pattern 2B have a line symmetry relationship with respect to the feeding point (e.g., the position of the RFIC package 3), the shapes of the two antenna patterns 2A, 2B may have a point symmetry relationship with respect to the feeding point. Further, the shapes of the two antenna patterns 2A, 2B may be asymmetric.

As described above, as have been illustrated in each exemplary embodiment using a specific configuration, according to these exemplary embodiments, in a case in which a product to which an RFID tag is attached is heated by the electromagnetic wave heating device, ignition of the RFID tag, and, further, melting or deformation of members of the product to which the RFID tag is attached are able to be prevented. Therefore, the exemplary embodiments of the present invention provide the wireless communication device that is can construct a system that automates accounting and packing of a purchased product in a store such as a convenience store that handles a wide variety of products such as food items and household goods, and is able to make great advance toward the practical application of the "unmanned" convenience store.

Finally, it is noted that the description of the above exemplary embodiments is illustrative in all respects but not restrictive. Modifications and changes are able to appropriately be made by those skilled in the art.

The invention claimed is:

1. A wireless communication device for transmitting and receiving a communication signal, the wireless communication device comprising:
   a base material;
   an antenna pattern disposed along a surface of the base material; and
   a high-loss member that is disposed adjacent to at least one of the antenna pattern and a conductor pattern connected in series to the antenna pattern,
   wherein the high-loss member is constructed with a high loss at a frequency higher than a frequency of the communication signal as compared with the antenna pattern and the base material.

2. The wireless communication device according to claim 1, wherein the high-loss member is disposed in contact with a portion of the antenna pattern.

3. The wireless communication device according to claim 2, wherein the high-loss member is provided at a cutting position of the antenna pattern or the conductor pattern, such that a cutting of the antenna pattern or the conductor pattern at the cutting position prevents a resonance of the antenna pattern at a frequency of an electromagnetic wave heating microwave.

4. The wireless communication device according to claim 1, wherein the high-loss member is ferrite of a chip ferrite bead.

5. The wireless communication device according to claim 4, wherein the conductor pattern is disposed in the chip ferrite bead.

6. The wireless communication device according to claim 1, wherein the antenna pattern comprises a meander line shape, and the high-loss member is disposed at at least one folded portion of the antenna pattern.

7. The wireless communication device according to claim 1, wherein the antenna pattern comprises a dipole-type electric field antenna having a feeding end that is connected to a feeding circuit disposed on the base material and an open end opposite the feeding end.

8. The wireless communication device according to claim 7, wherein the high-loss member is coupled to a portion of the antenna pattern between the feeding end and the open end in a lengthwise direction of the base material.

9. The wireless communication device according to claim 1, wherein the high-loss member overlaps the antenna pattern or the conductor pattern connected in series to the antenna pattern in a thickness direction of the base material.

10. The wireless communication device according to claim 1, wherein the high-loss member is constructed with a heating efficiency higher than a heating efficiency of the base material and the antenna pattern.

11. The wireless communication device according to claim 10, wherein the base material is configured to locally deform and apply stress to the antenna pattern when the high-loss member is heated in response to irradiation of an electromagnetic wave heating microwave.

12. The wireless communication device according to claim 11, wherein the antenna pattern is constructed to be cut in response to the stress applied by the base material when the high-loss member is heated.

13. The wireless communication device according to claim 1, wherein any portions of the high-loss member overlap the base material in a thickness direction of the base material.

14. A wireless communication device for transmitting and receiving a communication signal, the wireless communication device comprising:
   a base material;
   an antenna pattern disposed on a surface of the base material; and
   a device protection component disposed adjacent to the antenna pattern and constructed with a heating efficiency higher than a heating efficiency of the base material and the antenna pattern, such that the base material is configured to locally deform and apply stress to the antenna pattern when the device protection component is heated in response to irradiation of an electromagnetic wave heating microwave.

15. The wireless communication device according to claim 14, wherein the device protection component is disposed in contact with a portion of the antenna pattern.

16. The wireless communication device according to claim 15, wherein the device protection component is provided at a cutting position of the antenna pattern, such that a cutting of the antenna pattern at the cutting position prevents a resonance of the antenna pattern at a frequency of the electromagnetic wave.

17. The wireless communication device according to claim 14, wherein the device protection component comprises ferrite of a chip ferrite bead.

18. The wireless communication device according to claim 14, wherein the device protection component overlaps the antenna pattern in a thickness direction of the base material.

19. The wireless communication device according to claim 14, wherein the antenna pattern comprises a dipole-type electric field antenna having a feeding end that is connected to a feeding circuit disposed on the base material and an open end opposite the feeding end.

20. The wireless communication device according to claim 14, wherein the device protection component is a high-loss member constructed with a high loss at a frequency higher than a frequency of the communication signal as compared with the antenna pattern and the base material.

* * * * *